United States Patent
Mannepalli et al.

(10) Patent No.: US 8,793,292 B1
(45) Date of Patent: Jul. 29, 2014

(54) SYSTEM AND METHOD FOR COMPUTER SIMULATIONS

(75) Inventors: Rao Y. Mannepalli, Deptford, NJ (US); Paul D. Albertelli, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 443 days.

(21) Appl. No.: 12/604,501

(22) Filed: Oct. 23, 2009

(51) Int. Cl.
*G06F 12/00* (2006.01)
*G06F 17/30* (2006.01)
*G06F 17/50* (2006.01)

(52) U.S. Cl.
USPC .............................. 707/828; 707/940; 703/18

(58) Field of Classification Search
USPC ..................... 707/821, 828, 912, 940; 703/18
See application file for complete search history.

(56) References Cited

U.S. PATENT DOCUMENTS

| | | | |
|---|---|---|---|
| 6,237,143 B1* | 5/2001 | Fontana et al. | 717/127 |
| 6,907,422 B1* | 6/2005 | Predovic | 1/1 |
| 7,930,070 B2 | 4/2011 | Imes | |
| 7,991,512 B2 | 8/2011 | Chandra et al. | |
| 2005/0114097 A1* | 5/2005 | Duncan | 703/1 |
| 2005/0114847 A1* | 5/2005 | Whalley | 717/140 |
| 2005/0246640 A1* | 11/2005 | Lacy | 715/713 |
| 2006/0101053 A1* | 5/2006 | Proctor | 707/102 |
| 2006/0184540 A1* | 8/2006 | Kung et al. | 707/10 |
| 2007/0168974 A1* | 7/2007 | Mockford | 717/124 |
| 2007/0179919 A1* | 8/2007 | Kropaczek et al. | 706/19 |
| 2007/0214178 A1* | 9/2007 | Sheffler et al. | 707/104.1 |
| 2008/0189095 A1* | 8/2008 | Chen et al. | 703/14 |
| 2009/0038668 A1 | 2/2009 | Plaisted | |
| 2009/0093916 A1 | 4/2009 | Parsonnet et al. | |
| 2011/0023019 A1* | 1/2011 | Aniszczyk et al. | 717/128 |
| 2011/0047052 A1 | 2/2011 | Cornish | |
| 2011/0066258 A1 | 3/2011 | Torzhkov et al. | |
| 2011/0166718 A1 | 7/2011 | Van Bael et al. | |

FOREIGN PATENT DOCUMENTS

WO WO 9952048 A1 * 10/1999

OTHER PUBLICATIONS

Kalogirou A, S. Use of TRNSYS for modeling and simulation of a hybrid pv-thermal solar system for Cyprus, Renewable Energy vol. 23, Issue 2. Jun. 2001, pp. 247-260.*
Bishop "Introduction to Computer Security" 26 Oct. 2004. Addison-Wesley Professional. 34 selected pages.*
Blaha et al. "Relational database design using an object-oriented methodology" Apr. 1988. Communications of the ACM. vol. 31 Issue 4. pp. 414-427.*
Yiting Wang, "Chasing the Sun: Concentrated Solar Power", 5 pages, printed from Internet on Aug. 19, 2011, Copyright 2008.

(Continued)

*Primary Examiner* — James E Richardson
(74) *Attorney, Agent, or Firm* — Howard IP Law Group, PC (57) ABSTRACT

A system and computer-implemented method for tracking and displaying computer files used in computer simulations of engineered or industrial process plants. The system includes a computer processor, computer readable medium, and control logic stored on the computer readable medium and executed by the processor. The processor is operative to run the computer simulation of the plant and automatically compiles a list of all files used and/or created during the simulation. In one embodiment, the list includes information about the location/path of each file on the system and its associated software program required to open and view the file contents. The list may further be displayed to a system user and allows the selection of one or more files to be viewed. The processor retrieves, opens, and displays the selected files from the system to the user.

17 Claims, 10 Drawing Sheets

(56) References Cited

OTHER PUBLICATIONS

Energy Basics: "Thermal Storage Systems for Concentrating Solar Power", 2 pages, printed from Internet on Aug. 19, 2011.
NREL: TroughNet—"Parabolic Trough Thermal Energy Storage Technology", 3 pages, printed from Internet on Aug. 19, 2011.
ScienceDirect—"Solar Energy Materials and Solar Cells: Discharging simulations of a thermal energy storage system for an indirect solar cooker", 12 pages, printed from Internet on Aug. 19, 2011.
Taylor et al., "Simulation of thermal storage systems in an integrated building simulation program", 5 pages, printed from Internet on Aug. 19, 2011.

* cited by examiner

TEST CASE-3 (USER VIEWS ALL FILES)

RESULTS FILES:-
   [1] /DATA/RESTORM/APS/APS-RESULTS.XLS

INPUT FILES:-
   [1] /DATA/RESTORM/APS/DETAILS-APS.TXT
   [2] /DATA/RESTORM/APS/DETAILS-APS.XLS
   [3] /DATA/RESTORM/APS/TOU-APS.TXT
   [4] C: /RAPIDSIM_07_18_2008/RESTORM-OP-MODEL.XML
   [5] C: RAO-RR-RESTORM.0.3/RESTORM03.RSP
   [6] /DATA/VV-MODEL/145 MW-WCT-NORMAL OPERATING BASE-CASE 37(40 IN LSB) .STP
   [7] C: /ECLIPSE_PROJECTS/RESTORM.2.0/STANDARD CSP SYSTEMS RAO.SAM OTHER FILES:-
   [1] /DATA/RESTORM/APS/APS-1998.TXT
   [2] /DATA/RESTORM/APS/APS-1999.TXT
   [3] /DATA/RESTORM/APS/APS-2000.TXT
   [4] /DATA/RESTORM/APS/APS-2001.TXT
   [5] /DATA/RESTORM/APS/APS-2002.TXT
   [6] /DATA/RESTORM/APS/APS-2003.TXT
   [7] /DATA/RESTORM/APS/APS-2004.TXT
   [8] /DATA/RESTORM/APS/APS-2005.TXT
   [9] /DATA/RESTORM/APS/8760-APS-1998.TXT.CSV
   [10] /DATA/RESTORM/APS/8760-APS-1999.TXT.CSV
   [11] /DATA/RESTORM/APS/8760-APS-2000.TXT.CSV
   [12] /DATA/RESTORM/APS/8760-APS-2001.TXT.CSV
   [13] /DATA/RESTORM/APS/8760-APS-2002.TXT.CSV
   [14] /DATA/RESTORM/APS/8760-APS-2003.TXT.CSV
   [15] /DATA/RESTORM/APS/8760-APS-2004.TXT.CSV
   [16] /DATA/RESTORM/APS/8760-APS-2005.TXT.CSV DISPLAY OPTIONS:-
   0. NONE
   1. RESULTS ONLY
   2. RESULTS & INPUT
   3. ALL INCLUDING DATA FILES
YOUR OPTION (0/1/2/3) = 3

FIG. 5

RESULTS FILES

FIG. 6

INPUT FILES

```
🔣 DETAILS-APS.TXT (C:\DATA\RESET ONM\APS) - GVIM1                    _ □ ×
FILE  EDIT  TOOLS  SYNTAX  BUFFERS  WINDOW  HELP
🖨 💾 📋 🖨 | ⤺ ⤻ | ✂ 📋 📋 | 🔍 🔎 🔎 | 📤 📥 👥 | T 🔤 💬 | ? 🔍

1    # DETAILS FILE NAME FOR PRODUCTION RUN1 DEMO
 2    #
 3    # FILE FORMAT
 4    # REC# 0 TOU DATA FILE NAME
 5    # REC# 1 TOD DATA FILE NAME
 6    # REC# 2 SIMULATION PARAMETRS (FILENAME \T SHEETNAME)
 7    # REC# 3 USER DEFINED VARIABLES (FILENAME \T SHEETNAME)
 8    # REC# 4 ADMIN CONTROLLED VARIABLES (FILENAME \T SHEETNAME)
 9    # REC# 5 DIRECTORY NAME FOR SAM DATA FILES
10    # REC# 6 SAM DATA FILES NAMES (TAB SEPARATED)
11    # REC# 7 RESULTS FILE NAME (INCLUDING DIRECTORY)
12    # ....
13
14
15    /DATA/RESTORM/APS/DETAILS-APS.XLS    PROPOSAL DETAILS
16    /DATA/RESTORM/APS/TOU-APS.TXT
17    /DATA/RESTORM/APS/TOD-APS.TXT
18    /DATA/RESTORM/APS/DETAILS-APS.XLS    SIMULATION PARAMETERS
19    /DATA/RESTORM/APS/DETAILS-APS.XLS    USER DEFINED VARIABLES
20    /DATA/RESTORM/APS//DETAILS-APS.XLS   ADMIN CONTROLLED VARIABLES
21    /DATA/RESTORM/APS/
22    #TESF-APS.TXT
23    APS-1998.TXT  APS-1999.TXT  APS-2000.TXT  APS-2001.TXT  APS-2002.TXT
         APS-2003.TXT  APS-2004.TXT  APS-2005.TXT
24    /DATA/RESTORM/APS/APS-RESULTS.XLS
25    /DATA/RESTORM/APS/DETAILS-APS.XLS    SAM COSTMODEL INPUT
26    /DATA/RESTORM/APS/DETAILS-APS.XLS    PROJECT DETAILS
                                                     1,1         ALL
```

FIG. 7A

| | A | B | C | D |
|---|---|---|---|---|
| 1 | INPUT TO THE COST MODEL SAM (LCOE) | | | |
| 2 | CAPITAL COSTS | | | |
| 3 | DIRECT COSTS | | | |
| 4 | SITE IMPROVEMENT COST ($/SQ-M) | 3 | | |
| 5 | SOLAR FIELD COST ($/SQ-M) | 300 | | |
| 6 | HTF SYSTEM COST ($/KWE) | 150 | | |
| 7 | STORAGE COST ($/KWHR) | 40 | | |
| 8 | FOSSIL BACKUP ($/KWE) | 0 | | |
| 9 | POWER PLANT COST ($/KWE) | 850 | | |
| 10 | CONTINGENCY (%) | 8.4 | | |
| 11 | | | | |
| 12 | INDIRECT COSTS | | | |
| 13 | EPC (% OF DIRECT COSTS) | 16 | | |
| 14 | PROJECT, LAND MISC (% OF DIRECT COSTS) | 3.5 | | |
| 15 | SALES TAX (%) | 7.75 | | |
| 16 | SALES TAX APPLIES TO % OF DIRECT COST | 80 | | |

SYSTEM AND METHOD FOR COMPUTER SIMULATIONS

FIELD OF INVENTION

The present invention relates to engineered or industrial process plants such as solar thermal energy power generating plants in some embodiments, and more particularly to a computer-based system and method for tracking data file usage while performing simulations of such plants.

BACKGROUND OF THE INVENTION

Computerized modeling and simulation is useful to predict the costs and performance associated with building and/or operating existing or planned engineered or industrial process plants of many different types. Not surprisingly, such simulations involve the use of extensive amounts of data in the form of electronic data files used by the computer processor(s) to run the simulations. These files contain plant physical equipment and system configuration information, operating parameters, capita, operating, and maintenance cost data, and performance attributes. In addition, such simulations also may generate a number of simulation results files allowing further analysis to optimize equipment configurations and operations. One exemplary type of an engineered or industrial process plant that is amenable to computer modeling is a solar thermal energy power generation plant.

Solar thermal energy systems represent a technology for capturing renewable radiant energy from the sun and converting that energy into thermal energy that can be used to generate electricity. Concentrating solar power (CSP) is one technology that offers electric utility scale power production. CSP systems include collectors such as mirrors or reflectors (sometimes referred to as heliostats or concentrators) that are arrayed in a solar collector field ("solar field" or "SF") which capture and in turn concentrate sunlight onto a thermal receiver. The thermal receiver contains a heat transfer fluid such as oil or molten salt (typically a mixture of 60% sodium nitrate and 40% potassium nitrate) that is heated to a temperature sufficient to produce steam via a combination of conventional fluid-to-steam heat exchangers. The steam is used to drive a conventional steam turbine-generator set ("power block" or "PB") which produces electricity that may be sold to a power grid operated by a an electric power distribution company or utility for delivery to its customers over a conventional power transmission network. Some present CSP system designs include parabolic trough systems, parabolic dish systems, and power tower systems that employ a plurality of reflectors which focus the solar energy onto a thermal receiver positioned atop a centrally-located tower.

Thermal energy storage (TES) is an integral part of CSP systems for capturing and storing as much solar thermal energy as possible when available to compensate for periods of time when sunlight is not available due to either weather conditions or time of day. TES basically employs an insulated hot storage tank and a pumping and piping system with suitable flow control valves which may temporarily store the heated heat transfer fluid or medium until needed to produce steam for generating electricity via the power block. In some systems, a combination of oil and molten salt may be used as the heat transfer fluids coupled with a combination of oil-to-salt and/or oil or salt-to-steam heat exchangers. In other systems, a single heat transfer fluid may be used. The heat exchangers are not 100% efficient; therefore, there will be thermal energy losses incurred when heat is exchanged. Typical heat exchanger efficiency without limitation is about 92% as an illustration. Accordingly, the net amount of thermal energy that may be either stored in TES or transferred to the power block will be less than the thermal energy produced by solar collector field.

Figure 9:
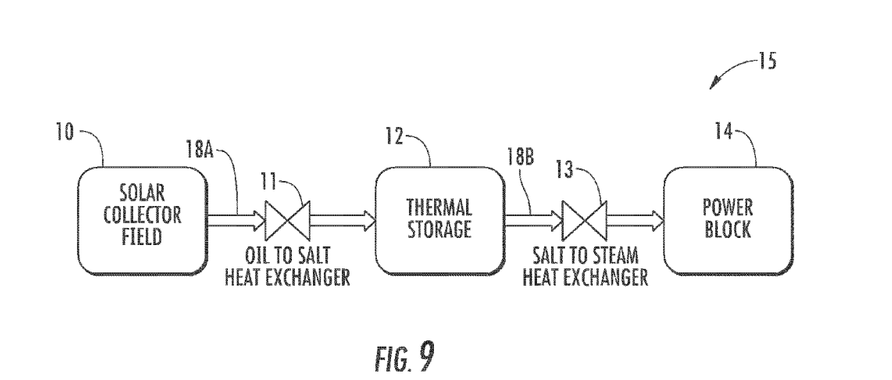
FIG. 9 is a diagram of a direct thermal energy store (TES) system.

Two types of TES systems are generally employed—direct storage and indirect storage TES. In direct TES, as shown in FIG. 9, a serial pumping and piping arrangement are used in the CSP system 15 between the solar collector field 10, thermal energy storage 12 which may comprise one or more conventional insulated storage tanks, and power block 14. Both the solar collector field 10 and thermal energy storage 12 may have one or more associated pumps that cause the heat transfer fluid or medium to flow in the desired direction through flow conduits 18A-B (and 18C shown in FIG. 10 discussed below). Whenever the solar collector field 10 generates thermal energy, it is sent to the TES. If the TES is full, the energy is dumped or wasted. When there is a demand to produce electric power, thermal energy is drawn from the TES storage tank to produce steam and drive the turbine-generator set of the power block. The embodiment shown employing dual heat transfer fluids requires both an oil-to-salt heat exchangers 11 and a salt-to-steam heat exchanger 13.

Figure 10:
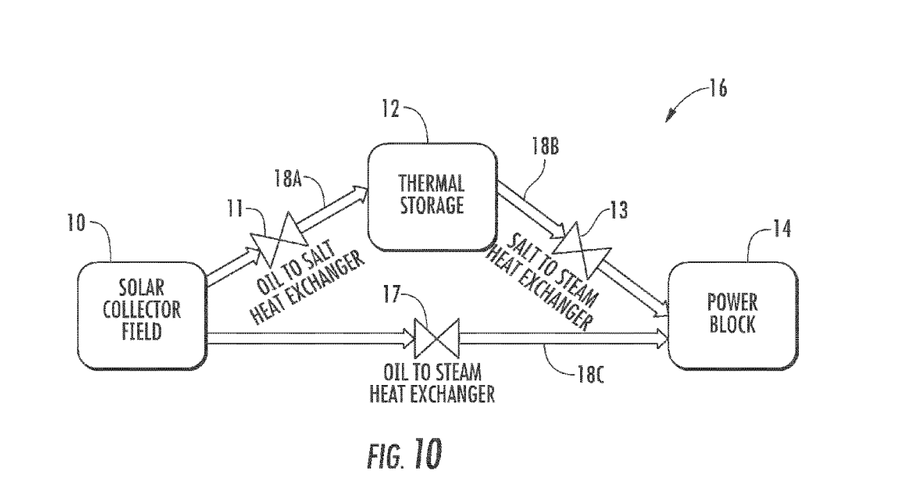
FIG. 10 is a diagram of an indirect thermal energy store (TES) system.

For indirect TES, as shown in FIG. 10, parallel pumping and piping arrangements are used in the CSP system 16 between the solar collector field 10, thermal storage 12, and power block 14. Therefore, thermal energy may be routed whenever generated by solar collector field directly to the power block 14 (an via oil-to-steam heat exchanger 17) and/or to the TES (via oil-to-salt heat exchanger 11) depending on whether there is a demand to produce electric power and/or the amount of thermal energy needed to produce sufficient steam to drive the turbine-generator set of the power block. The power block may draw thermal energy from both TES (via salt-to-steam heat exchanger 13) and directly from the solar collector field if needed.

Both direct and indirect TES have advantages and disadvantages. The overall efficiency of indirect TES is higher than direct storage (generally about 8% more in some instances) because two heat exchanges are not always involved in the thermal energy flow between the solar collector field and power block as shown in FIG. 10. The efficiency of direct TES is therefore inherently lower because two heat exchangers are always used in the system as shown in FIG. 9. However, direct TES has a simpler control system and is generally easier to optimize and schedule its operation. Optimization is more difficult with indirect TES because of its flexible operation since scheduling when to dispatch of thermal energy from the heated TES tank to the power block depends on the hours selected for electricity generation. In direct TES, by contrast, thermal energy must always pass through and be drawn from the heated storage tank whenever there is a demand to produce steam for generating electricity. Accordingly, indirect TES requires a more complex control system than direct TES.

Modeling and simulation of the foregoing solar power generating plants and their operation using a computer-based simulator system allows plant components and performance to be predicted and optimized through iterative simulation runs. To model and simulate the many design and operational aspects and parameter of a solar power plant (e.g. weather predictions, solar thermal energy availability, electric production, energy conversion efficiencies, operating and maintenance costs, expected revenues, etc.), however, is complex and typically requires a relatively large number of different stand alone computer or software programs often furnished by different vendors/sources. These computer programs each uses their own custom data or information files which must be opened and run using their own respective type of often proprietary computer software or application. In addition, each time a simulation is run with varying conditions which generally involves numerous iterative calculations, a large number of output or results files are also generated which must be later retrieved and reviewed by the user. The size of individual files involved in a simulation run can be very large as well. For example, solar availability modeling files may be 10 MB each or larger in size.

During each simulation listed earlier a large number of files are therefore accessed by the user and simulator system or created. The files are stored in many different directories (e.g. depending on the project, user, type of model being run, etc.) and may readily go into the tens of files in some cases. Each time, the user has to navigate several directories and open the files with the specified program. This specified program or software required to view these files can be different from the one that is associated by the operating system. To see the actual data in the file (which is tab delimited), the user uses gVim. Just to browse the data, the user may use notepad. To see a particular column or to plot the data in the file, the user may use Excel. And for examining the data, the user may use gVim, notepad, Excel, or other software program based on the type of examination needed.

When running the foregoing computer-based simulations, therefore, the user must therefore know and remember which data files are needed, where they are located in the computer-based simulator system in terms of drive and retrieval path (i.e. path/directory/subdirectories), and which particular computer program(s)/software is required to open, run, and view the files. Each time, the user has to navigate through several layers of directories/sub-directories and open the files with the required specified program/software (typically by "right clicking" and selecting a program from a list). Accordingly, this is a cumbersome, inefficient, and time consuming process even for an expert software user. If the simulation is run on a cluster/grid/network of computers (which is very common while running high fidelity simulations) the problem gets worse because the locations and paths leading to the files becomes even more convoluted.

An improved computer-based simulator system and method is therefore desired.

SUMMARY OF INVENTION

A system and computer-implemented method are provided for optimizing the modeling of an engineered or industrial process plant. In one embodiment, the process plant may be a CSP generating plant. The system generally includes a computer system including a main or central hub computer processor, computer readable medium, and program instructions or control logic stored on the computer readable medium operable to direct the operation of the processor. In one, the computer processor implementing the control logic is operable to track and display to a user via conventional graphic/video display devices the names, type/category, location (path and destination), and an associated software program of the computer files that are accessed and/or generated during a CSP plant simulation run. Advantageously, the system displays a list of these files available for viewing by the user and preferably offers the option to the user of retrieving and examining one or more of the displayed files. The system automatically tracks and remembers the software program or application associated with each data file needed to open and display the contents of the file so that the user need not remember this information. This capability is advantageous because the program needed to merely open display the data file contents to the user may differ from the program associated with the file type by the operating system.

Some additional benefits of the computer-based system and computer-implemented method according to embodiments of the present invention are that it: reduces the number of mouse clicks for a user; the user need not know where the files are stored; the user need not manually navigate to the home directories of individual files to open and view them; the user need not manually open the files; the user need not know the name of the program used to open and view the file, and user productivity is improved greatly because the system is fast and requires less manual operations than heretofore.

According to one embodiment, a system for tracking and displaying computer files used in computer simulations of an engineered or industrial process plant includes a computer processor and computer readable medium accessible to the processor, and control logic stored on the computer readable medium and executed by the processor. The computer processor, when executing the control logic, being operative to run a simulation of the process plant, compile a list of simulation-related files used or created during the simulation, and display the list preferably on a display device. In some embodiments, the processor is further operative to store a full path name of each simulation-related file on the list in a tracking-review file created by the processor and stored on the computer readable medium. The full path name of each simulation-related file preferably is added to the tracking-review file in real time as the simulation is run by the processor for retrieving each simulation-related file. In additional embodiments, the processor is further operative to automatically associate each simulation-related file with a software program or application which is required to open and display the contents of each simulation-related file. In other embodiments, the processor is further operative to receive a selection request by a user to view at least one of the displayed simulation-related files, retrieve each requested file using the full path name of each requested file, and automatically open and display the contents of each requested file on a graphic display device to the user using the software program associated with each requested file.

A method is provided that is performed by a computer processor executing program instructions for tracking and displaying computer files used in running computer simulations of an engineered or industrial process plant. In one embodiment, the computer-implemented method includes the steps of: running a computer simulation of the process plant on a computer system including a computer processor and computer readable medium operably accessible to the processor and containing program instructions executed by the processor; the processor creating in real time during the simulation a tracking-review file including the full path names of simulation-related files used or created during the simulation; and the processor displaying a list of simulation-related files in the tracking-review file to a user on a graphic display device. In some embodiments, the method further includes the processor receiving a selection request by the user to display one or more of the simulation-related files, retrieving the selected file or files, and displaying the contents of the selected file or files preferably on a display device. The method may further include the processor automatically associating each simulation-related file with a respective software program which is required to open and display the contents of each simulation-related file. The method further includes the processor advantageously automatically opening and displaying the contents of the user-selected file or files with the software program without the user specifying which program to use.

BRIEF DESCRIPTION OF THE DRAWINGS

The features of the preferred embodiments will be described with reference to the following drawings where like elements are labeled similarly, and in which.

All drawings shown herein are schematic and should be interpreted accordingly.

DETAILED DESCRIPTION OF THE INVENTION

In the description of embodiments of the invention disclosed herein, any reference to direction or orientation is merely intended for convenience of description and is not intended in any way to limit the scope of the present invention. Moreover, the features and benefits of the invention are illustrated by reference to preferred embodiments. Accordingly, the invention expressly should not be limited to such preferred embodiments illustrating some possible but non-limiting combination of features that may be provided alone or in other combinations of features; the scope of the invention being defined by the claims appended hereto.

Figure 1:
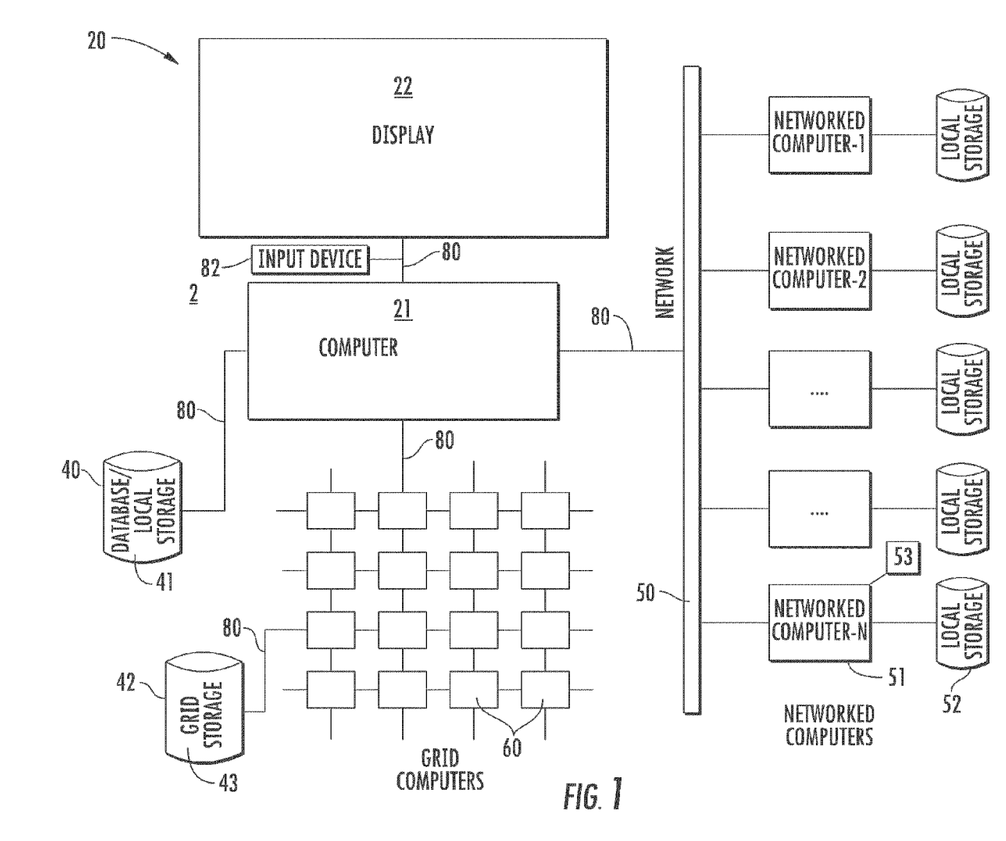
FIG. 1 is a schematic diagram of one embodiment of a microprocessor-based networked computer and communication system according to the present invention.

FIG. 1 depicts one embodiment of a computer-based simulator system 20, which in some embodiments may be configured and programmed for the specialized purpose of conducting modeling or simulations for Concentrated Solar Power (CSP) generating plants as already described herein (see Background of Invention section). Simulator system 20 preferably is a networked computer-based data processing system having a primary central or hub computer processor 21 (hereafter "central computer 21") provided with suitable conventional memory and preferably an associated graphical user interface (GUI) display device 22 operably connected to the central computer 21 for interfacing with the system via any suitable conventional input devices 82 such as keyboards, mouse or pointer devices, or others as will be readily known to those skilled in the art.

In some embodiments, the computer software or program stored in and implemented by simulator system 20 for conducting the CSP modeling or simulations may be referred to for convenience by the non-limiting arbitrary name of "RESTORM" (renewable solar thermal objective resource modeling manager) in the description provided herein and accompanying figures. The RESTORM software implements various control logic routines and sub-routines that calculate parameters such as thermal efficiencies, available solar thermal energy, operating and maintenance costs, etc.

Referring now to FIG. 1, central computer 21 serves as the main control computer for simulator system 20 and directs the operation of and flow of data through system 20. In one non-limiting embodiment, central computer 21 includes a central processing unit or processor (CPU) and pre-programmed computer programs/software executing program or control logic instructions operable to direct operation of computer 21 to perform the solar power plant simulations. It will be appreciated that the program instructions or control logic may be implemented in hardware, firmware, software, or any combination thereof. The program instructions or control logic may be stored and encoded on any suitable commercially available computer readable medium and is readable by computer 21 for implementation thereby.

Suitable computer readable medium for use with central computer 21 may include any conventional type of volatile or non-volatile media such as without limitation computer memory of any type (e.g. any type of RAM, ROM, flash memory, memory cards or chips, etc.) and magnetic, magneto-optical, or optical media, discs, or tapes (e.g. hard disks, CD, DVD, magnetic tape, etc.).

With continuing reference to FIG. 1, central computer 21 further includes one or more accessible conventional data storage devices 40 having computer readable medium that includes a database 41 in which data and data files used by computer 21 are stored.

In one embodiment, the data therefore includes information related to solar generating plant that is used in the modeling and simulation runs for such plants. Data storage devices 41 may be local and/or remote being accessible via any conventional communication network or links such as the Internet.

With continuing reference to FIG. 1, central computer 21 may further be operably linked or networked to a plurality of secondary grid computers 60 that provide the additional computing power needed for performing the various different types of complex calculations and data manipulation required for solar power plant or other types of simulation runs. Grid computers 60 may therefore be each configured to run customized computer programs or software that perform the many different and specialized modeling calculations encountered in solar power plant simulations. Grid computers 60 may be stand alone processing devices and/or shared computers accessible to central computer 21 which actively directs the operation of the grid computers and transmits/receives data to and from the grid computers. One or more local and/or remote data storage devices 42 may be provided that are accessible to the grid computer 60 network and which contain conventional computer readable medium for storing database(s) 43 usable by the grid computers.

With continuing reference to FIG. 1, simulator system 20 may further be operably connected to a user computer network 50 that allows a plurality of individual local or remote users to access the system via central computer 21. Computer network 50 includes a plurality of networked conventional processor based user computers 51 which may each have associated local and/or remote data storage devices including databases 52 and graphic display devices 53 (GUIs). Computers 51 may be operably linked together within network 50, and network 50 may in turn be linked to computer 21, by any suitable conventional means (e.g. wired, wireless, and combinations thereof) such as data communication links 80 described herein. User computers 51 may be local and/or remote to central computer system 21 and accessible via the Internet or other suitable conventional remote access means. Computer network 50 allows individual users to access simulator system 20 for conducting solar power generating plant simulations via computer system 21.

A plurality of two-way data communication links 80 are provided that operably link together the various components and systems as shown in FIG. 1 and described herein. Data communication links 80 therefore are operable to transmit/exchange data, information, files, control commands, and other signals electronically between the components shown in FIG. 1. The data communication links 80 may include without limitation conventional wireless, wired, "on-board" (circuit board) conductors, Internet-based links, and combinations thereof.

According to one aspect of the present invention, a computer-implemented method embodied in a computer software or program executed by computer-based simulator system 20 (see FIG. 1) is provided that improves the efficiency with which a user can interface with the system to perform generating plant simulations and modeling. The method advantageously organizes and automates the handling of data files and computer programs involved with the simulation. In a preferred non-limiting embodiment, the system and method may be used to simulate a solar power generating plant design and operations.

In a preferred embodiment, the present invention provides an intelligent object or software (i.e. object-oriented software) including the control logic routines executed by central computer 21 that performs the functions of tracking, storing, retrieving, and subsequently displaying electronic files accessed and/or creating during CSP plant simulation runs to a user. For convenience, this intelligent software object is referred to herein by the non-limiting arbitrary name of "Display Manager." Display Manager may be created by conventional object-oriented programming; such programming methodology and software objects being well known to those skilled in the art. Display Manager may be written in any suitable object oriented software programming language such as without limitation Java™. A software object typically refers to a software program that comprises a collection of self-sufficient interacting modules or "objects" that are essentially data structures consisting of data fields and methods (subroutines) which together perform the object's overall intended function. The Display Manager software object is operable to receive data and instructions from portions of simulator system 20 (e.g. grid computers 60, networked computers 51, and central computer 21), process the instructions and/or data, and output signals containing data and messages to selected portions of system 20. In a preferred embodiment, Display Manager software object is implemented and runs on central computer 21.

Figure 2:
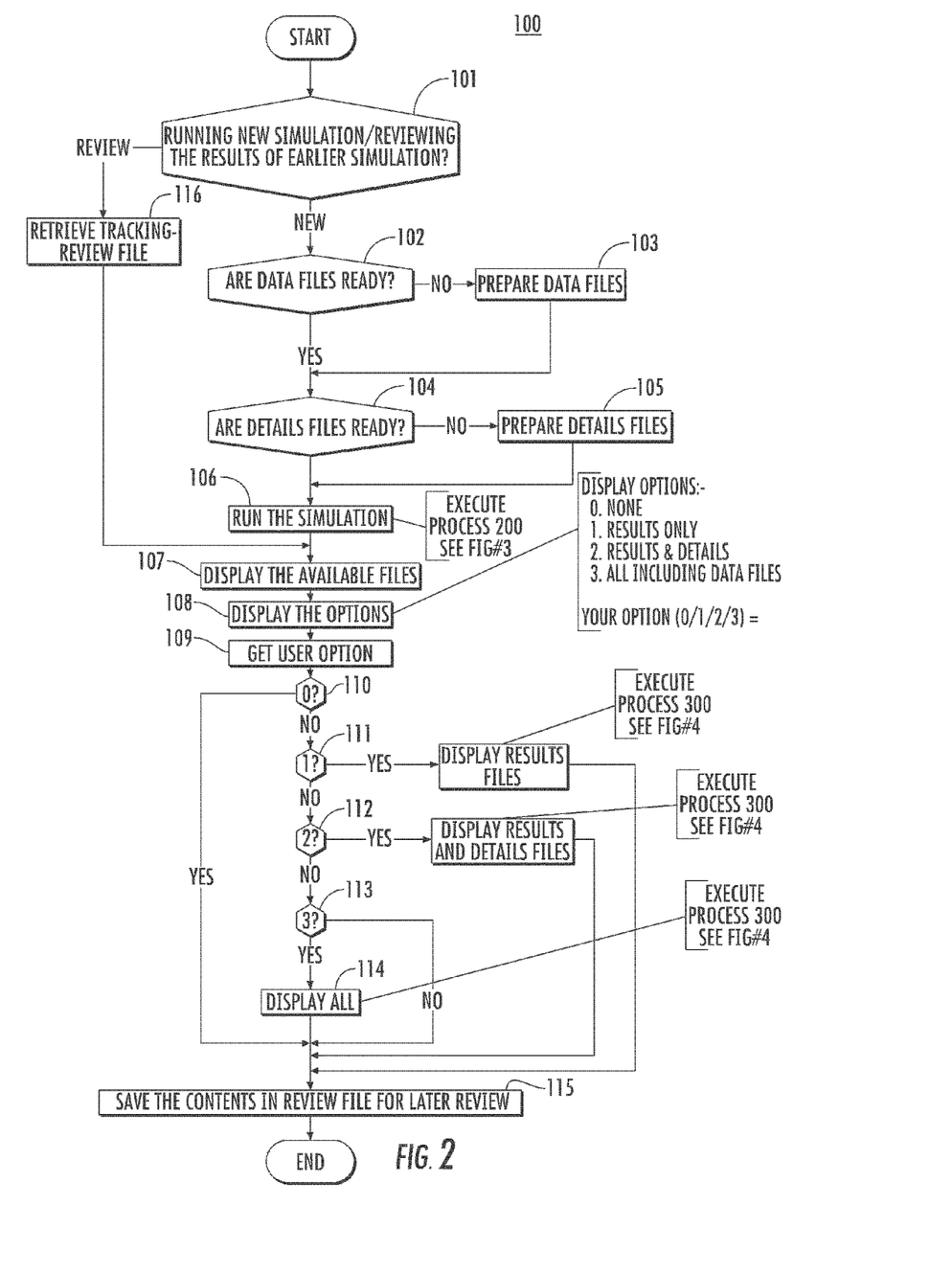
FIG. 2 is a flowchart showing an exemplary computer program or control logic executed by the computer system of FIG. 1 for tracking, retrieving and displaying electronic data files associated with performing CSP generating plant simulations.

FIG. 2 shows one possible embodiment of a main computer program or control logic instructions/routine 100 embodied by the Display Manager software object that may be pre-programmed into and executed by simulation system 20 (see FIG. 1) for improving the efficiency of a user's interaction with the system. In a preferred embodiment, logic routine 100 is executed by central computer 21. Control logic routine 100 may be stored on any suitable conventional computer readable medium or memory that is operably associated with and accessible to central computer 21 via system 20. Central computer 21, programmed with the Display Manager logic routine 100, is therefore configured in one embodiment for the special purpose of advantageously allowing users to interface with simulator system 20 greater efficiently through better handling, access to, and display of files used or generated during the CSP plant simulations than heretofore.

Referring now to FIG. 2, Display Manager control logic routine 100 begins in step 101 wherein a user makes a decision and inputs a selection into central computer 21 to signal whether a new simulation will be run or whether the user wants to review files associated with a previously run simulation. If the computer receives an input signal to review a the results of a prior simulation, the user inputs the review file name from the previous simulation when prompted by central computer 21, which then executes step 116 in which the designated review file is retrieved from one of the databases associated with data storage devices 40, 42, or 52. Control passes then to step 107 further described herein below in which a list of all files associated with the requested prior simulation review file are displayed to the user by central computer 21 via display device 22 or 53.

If alternatively in step 101 the central computer 21 receives a signal that a new simulation has been selected by the user to be run, control passes to step 102. In step 102, a test is performed by computer 21 to determine whether data files required for the new simulation run are ready and available. In some embodiments, the data files may be stored in databases 41 and/or 42 (see FIG. 1).

The types or categories of files used and generated by simulator system 20 to conduct plant simulations may include without limitation files classified as input or details files, data files, and output or results files. These and other files used in running the computer simulation may be referred to herein as "simulation-related files" for convenience. Input or details files are design details/configuration files related to the CSP physical plant equipment/system being modeled including operating parameters, efficiencies, power consumption, flow rates, etc. of heat exchangers, power block, pumps, solar collectors, etc. Input files may further include time of use (TOU) for mapping expected power demand and CSP plant generating times, time of day (TOD), and other anticipated or actual operating characteristics, etc. These input files are opened and examined during the initial simulation runs by central computer 21. The data files are generally very large files (e.g. 10-20 MB are not uncommon), which are opened and examined only a very few number of times during the initial simulation runs. Typical data files include detailed information or data related to solar thermal energy available from the solar field, annual weather data, etc. The output or results files contain the results of the plant simulations generated by simulator system 20 which are of immediate interest to the user. The user opens, examines and/or copies the results every time during the simulations in many instances.

Returning now to FIG. 2, if a "Yes" decision is returned in step 102, control passes to step 104. If a "No" is returned in step 102, the user needs to get or generate/prepare the required data files in step 103. In step 104, a test is performed by central computer 21 to determine whether design details/input files are available and ready. If a "Yes" result is returned, control passes to step 106. If a "No" result is returned, the user needs to get or generate/prepare the details/input files in step 105.

Figure 3:
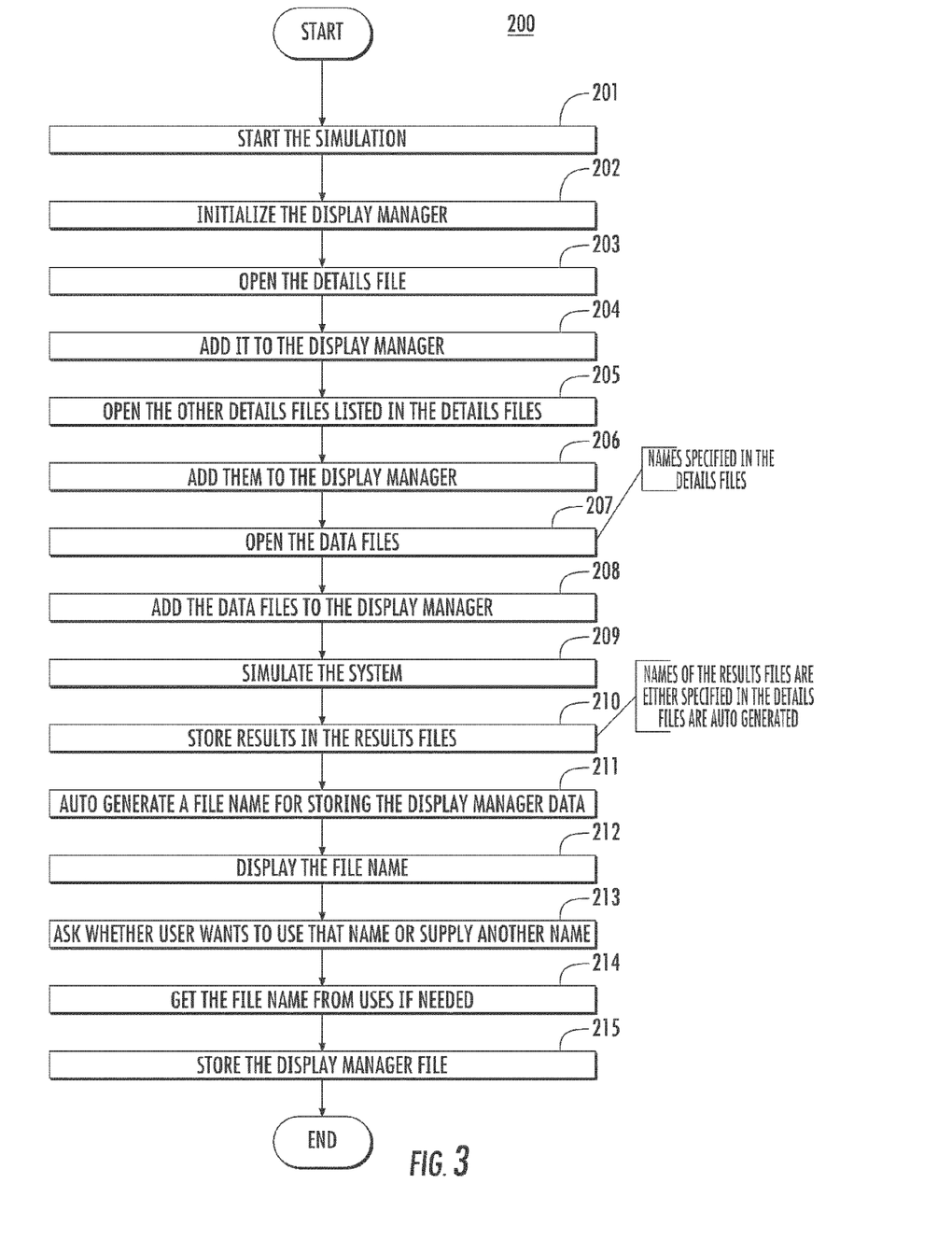
FIG. 3 is a flowchart showing an exemplary computer program or control logic routine executed by the computer system of FIG. 1 for running the CSP generating plant simulations and compiling information associated with the electronic data files used and generated therefrom.

With continuing reference to FIG. 2, the CSP plant simulation is run in step 106, which is represented in more detail by control logic routine 200 shown in FIG. 3 which is stored on any computer readable medium accessible to simulation system 20. According to one aspect of the present invention, control logic routine 200 in particular includes the steps executed by central computer 21 that allows computer 21 to monitor, track, and remembers all of the files that are accessed and/or created during the plant simulation for later retrieval and display by the user, as further described herein. In a preferred embodiment, logic routine 200 is executed by central computer 21.

Referring now to FIG. 3, control logic routine 200 preferably includes the following sequential steps. Step 201 starts the plant simulation and step 202 initializes the Display Manager in which central computer 21 clears the details of all previous simulation runs if any, and initializes the file counters (i.e. number of files) for all categories of files (data files, input/details files and results files) to "0". Step 203 opens the input/design details files to be used in the simulation. In step 204, central computer 21 identifies, collects, and stores/adds to the Display Manager software object tracking-review file information about each of these input/details files with sufficient detail to permit subsequent retrieval and display of those files later in logic process 100 (FIG. 2) by a user. In a preferred embodiment, this file information (also referred to herein as file "tracking and display attributes") includes without limitation the full path name of each file (including the cluster/network node name), type of the file, and the name or other identifier of what particular software program or application was used to read/create during the simulation. Display Manager therefore advantageously creates an association between each input/details file and its respective display software program/application in which central computer 21 records and stores (i.e. "remembers") the identity of what program is used to read/write the contents of each file respectively during and simultaneously with running the simulation so that the user advantageously need not remember and select the required program manually. The Display Manager thus gradually and efficiently builds or compiles a list of all the input/details files used in the simulation in real time, as well as making a dynamic software program association with each of those files, that includes all of the file tracking and display attributes noted above. It will be appreciated that this is different from the static association of file types in which each and every time a file is associated with one type of file extension and opened with that same software program/application in system wide usage. In some instances, however, the software program used by central computer 21 to open a file may change from one process plant simulation to the next. Beneficially, the Display Manager uses dynamic file association wherein the software program association is created each time during the simulation. For example, if an .xml file is opened during the simulation with RapidSim, the Display Manager software object remembers and opens the file with RapidSim. In a subsequent simulation, a different program other than RapidSim may be used to read/write the .xml file which is then remembered by Display Manager. Accordingly, Display Manager generates and uses its dynamic association that functions to allow central computer 21 to retrieve files based on user selection, and then open, read, and display the selected file contents to the user using the same previously associated software program used in the respective simulation run.

Another advantage of the present invention is location transparency. The user need not know where the files are available and located in system 20 (i.e. database, grid, network, path, etc.) in order to retrieve and display the files. Display Manager software object automatically records and stores the information necessary to retrieve the files simultaneously with running the plant simulation.

In some embodiments, the foregoing file tracking and display attributes are preferably recorded and stored in a unique Display Manager tracking-review file created for and during each simulation run. The tracking-review file may be stored on any computer readable medium operably accessible to computer 21 anywhere in system 20 such as data storage devices 40, 42, or 52. Each Display Manager tracking-review file may be automatically assigned a unique file name by central computer 21 (see, e.g. "Test case-3" shown in FIG. 5). The contents of the tracking-review file include a list of all the simulation-related files touched or created during the simulation.

Returning now to FIG. 3 and logic routine 200, when running complicated simulations, the top level details/input files and data files may each contain the names of other sub-level details or data files, which in turn can contain other even lower level details or data files. For example, the top level design details file may contain the name of lower level details file containing information for TOU. In step 205, central computer 21 opens the other lower level details files listed in the top level details files, which are also added to the Display Manager in step 206.

Step 207 opens the data files, which are then also added to the Display Manager in step 208 similarly to the details or input files handled in Steps 203 and 204 as described above. Step 208 may be following by steps similar to steps 205 and 206 (not shown) to open and add other lower level data files to Display Manager.

With continuing reference to FIG. 3 and control logic routine 200, the CSP system simulation is run in step 209 using the design details and data files opened in preceding steps 203, 205, and 207 described above. The results of the modeling or simulation are then stored in corresponding results files in step 210 which are added to the Display Manager tracking-review file similarly to the details and data files in the preceding step, thereby completing compilation of the list of all simulation-related files used or created during the process plant simulation. In step 211, the simulator system 20 automatically assigns or generates a suggested name for the Display Manager tracking-review file containing all the file tracking and display attributes. The simulator system 20 may display the auto-generated Display Manager tracking-review file name suggestion to the user in step 212 (e.g.: "simulation-of-csp-date-month-year-time.txt:), then optionally may offer the user a choice in step 213 of either using the automatically generated tracking-review file name for the results file or option to supply a different name which is type and input (e.g. "csp-sim-date-month-year.dat"). In step 214, the simulator system receives a response input the user to the tracking-review file naming choice.

In step 215, the system 20 creates and stores the Display Manager tracking-review file on computer readable medium accessible to the system such as in databases 41 or 43, or in local memory.

Figure 5:
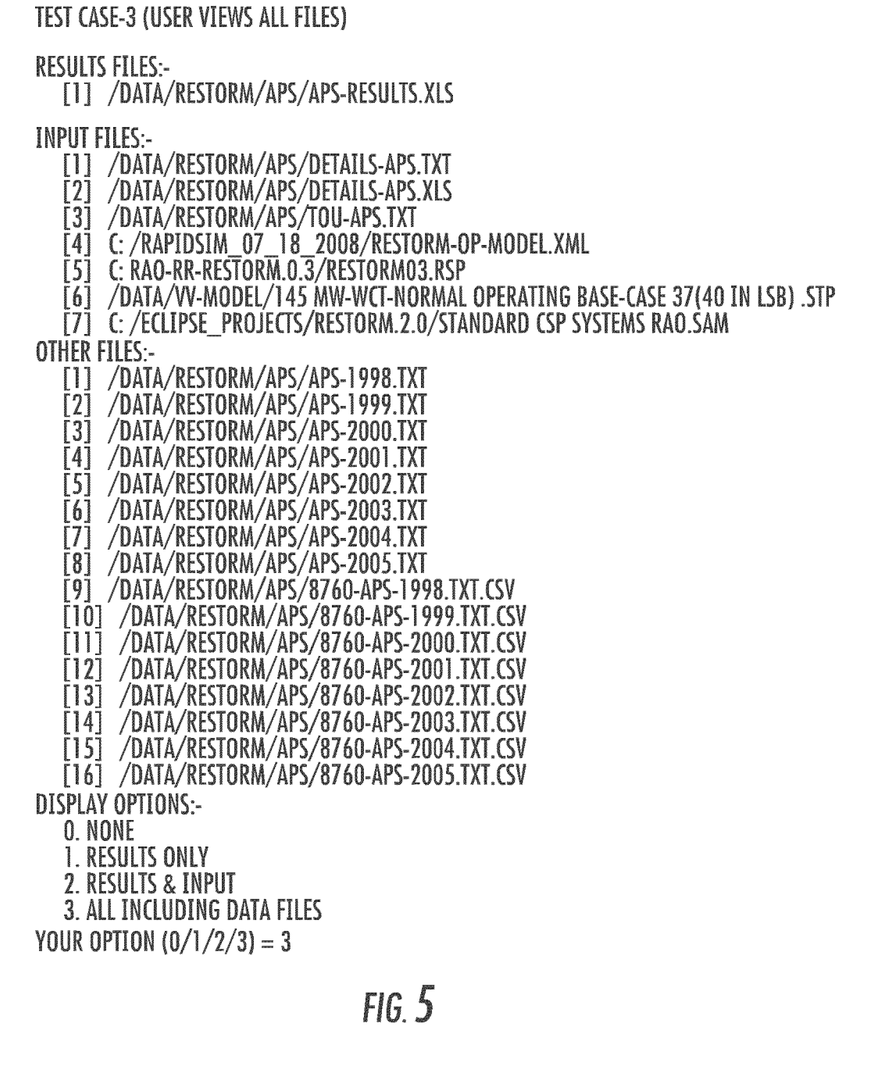
FIG. 5 is an exemplary graphic display produced by computer system of FIG. 1 listing electronic data files associated with performing CSP generating plant simulations and display options to a user.

Returning now to FIG. 2 and control logic routine 100, after the CSP simulation in step 106 and routine 200 (shown in FIG. 3 and described above) are run, control passes to step 107. In step 107, the Display Manager via simulator system 20 displays a list of all of the results, input or details, and other miscellaneous files that may have been accessed, used, and/or generated during the simulation run to the user on a display device. In some embodiments, depending on wherein the user is interacting with the simulator system 20, the files available for viewing may be displayed on display device 22, display devices 53 associated with networked computer 51, or other display device operably linked to system 20 depending on the access point to the system by the user. (see FIG. 1). Step 107 therefore displays the contents of the Display Manager tracking-review file created and stored in step 215 shown in FIG. 3. An exemplary embodiment of the information that may be displayed on display devices 22 or 53 to the user in step 107 is shown in FIG. 5. As can be seen, simulator system 20 in conjunction with Display Manager control logic routine 100 automatically compiles and categorizes the files used and/or generated in the CSP simulation into several types or categories and selection choices such as without limitation Results files, Input (or details) files, and Other (i.e. data and other miscellaneous) files. As further seen, system 20 is operative to display a list of Display Options to the user (step 108 in FIG. 2) offering the user a choice of which, if any types or categories of files, are desired to be viewed. In one possible embodiment, as shown in FIG. 5, the display options or choices displayed and offered to the user may include without limitation (0) None, (1) Results only, (2) Results and Input (Details), or (3) All including data files.

With continuing reference to FIG. 2, the user selects a display option which is input and received by the simulator system 20 in step 109 via any suitable conventional computer input device 82 (FIG. 1). In step 110, a decision step, if the user has selected the (0) None option to files to be displayed, control passes to step 115 in which system 20 saves the contents of the Display Manager tracking-review file (previously created and named in logic process 200, FIG. 3 as described above) for later retrieval and review by the user or other users.

Figure 4:
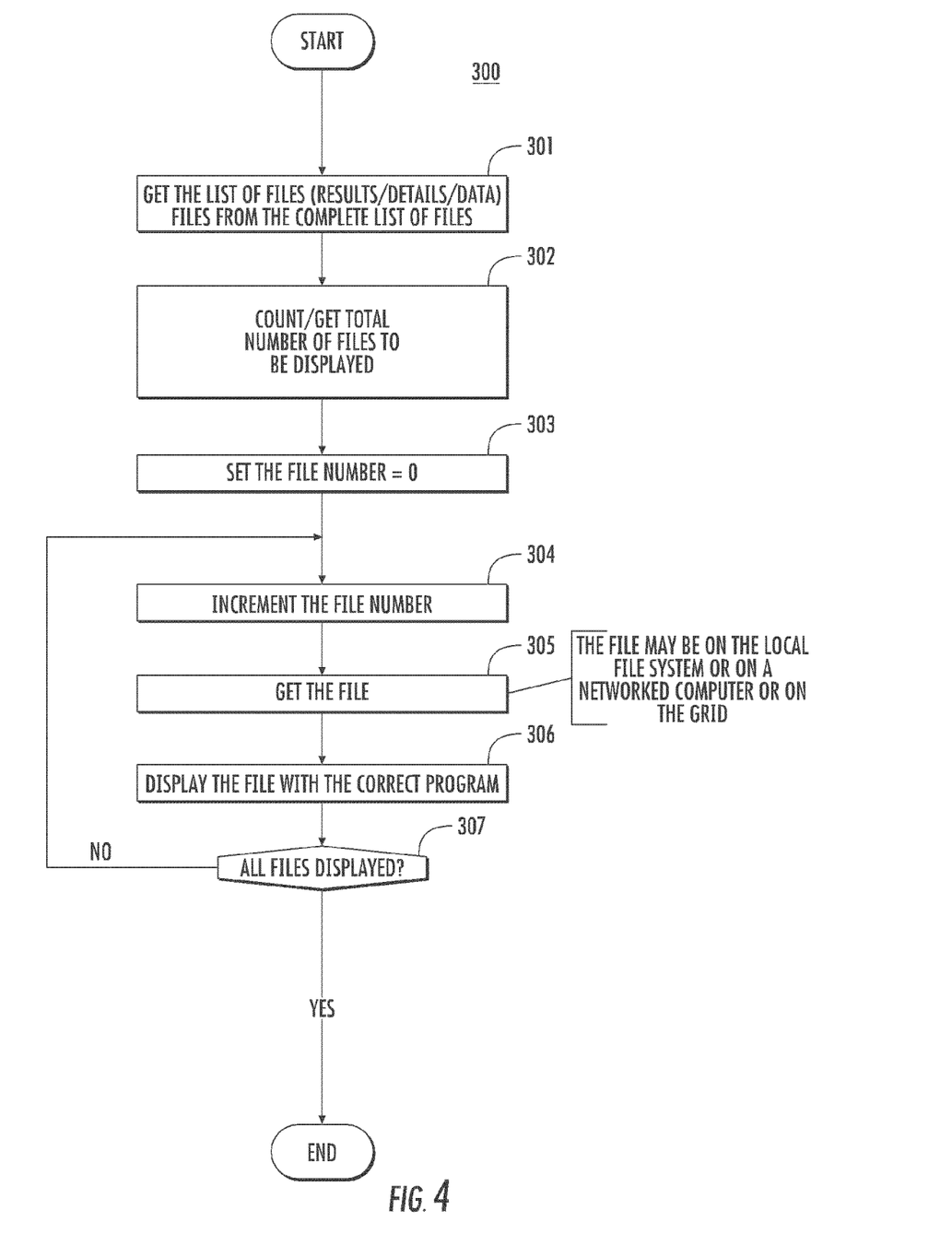
FIG. 4. is a flowchart showing an exemplary computer program or control logic executed by the computer system of FIG. 1 for retrieving and displaying a plurality of electronic data files associated with performing CSP generating plant simulations.

With continuing reference to FIG. 2, if the user does not select display option (0) None in step 110, control passes to either step 111, or step 112, or step 113 in which system 20 executes control logic decisions to determine which type of files to retrieve and display to the user based on the user's selection. As shown, without requiring further explanation, if a "Yes" is returned in either steps 111, 112, or 113, control logic routine 300 is executed as shown in FIG. 4 in which the selected files are retrieved and displayed. In a preferred embodiment, logic routine 300 is executed by central computer 21.

With reference now to FIG. 4 and control logic routine 300, step 301 is executed by system 20 in which the system determines which type of files have been selected by the user for display from choices (1) to (3) as described above in control logic routine 100 (steps 109-114). Based on the type of file selected for display, step 302 is executed in which the total number of files to be retrieved by central computer 21 from step 301 is counted which initiates a file retrieval/display counter. This counter is also used to loop through all the files that need to be retrieved and displayed to ensure all required files have been accounted for. With continuing reference to FIG. 4, the initial file number is set to zero ("0"). In step 304, the first file to be retrieved is incremented (initially to "1"). Step 305 is then executed in which the first file is automatically retrieved from its stored location on computer readable medium, such as without limitation databases 41, 43, or 52. The Display Manager control logic 100 has previously already stored the file full path name (see FIG. 5) allowing the system 20 to automatically retrieve the file without further manual input from the user. The simulator system 20, and in particular central computer 21, next displays the first file contents to the user on display device 22 or 53 automatically using the proper software program or application required by the first file to display its content to the user. The required software program or application needed has previously been stored and associated with each simulation-related file type by the system 20. Advantageously, the user need not know or specify the required software program to open and view/display the file contents as in the past. In step 305, therefore, central computer 21 automatically invokes the required associated software program to open and display the simulation-related file contents.

With continuing reference to FIG. 4, control next passes to a decision step 307 which determines whether all of the files selected for display by the user have been retrieved and displayed in the preceding steps. If a "No" is returned, control returns to step 304 and steps 305 and 306 are repeated in a control loop until all selected files have been retrieved and displayed by system 20 to the user on display device 22 or 53. After the last file has been retrieved and displayed, routine 300 ends following a "Yes" answer to decision step 307.

Referring again now to FIG. 2 and control logic routine 100, step 115 is next executed in which system 20 saves the contents in a review file for later retrieval and review by the user or other users. Routine 100 then terminates.

The foregoing program instructions/control logic routines described herein which direct the operation of central computer 21 may be created by any conventional programming techniques. Accordingly, it is well within the ambit of those skilled in the art to configure and prepare the code required to executed the logic routines on computer 21 and achieve the associated functionality described herein.

Figure 6:
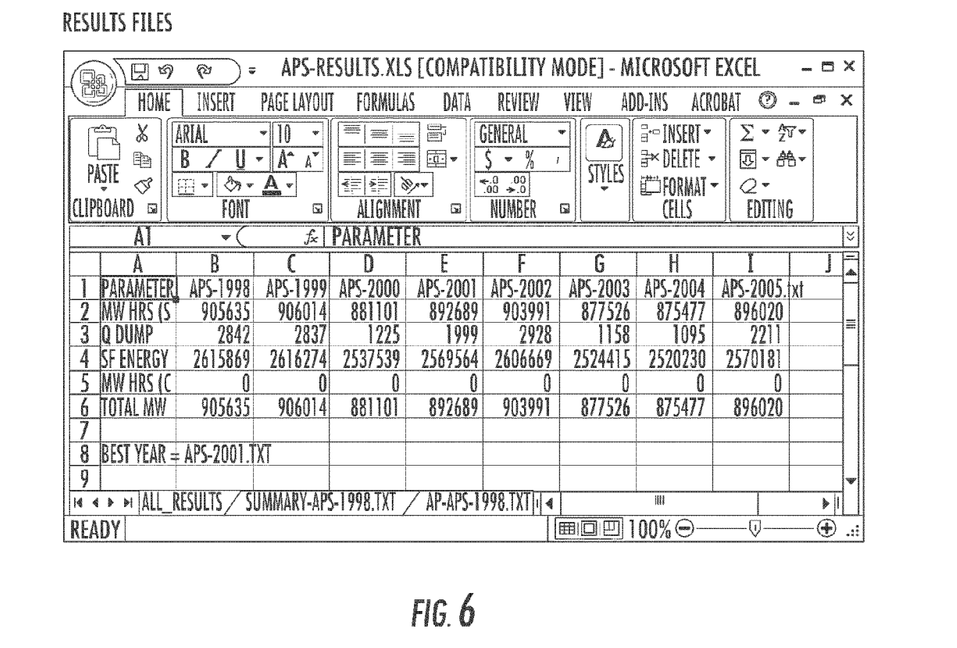
FIG. 6 is an exemplary graphic display produced by computer system of FIG. 1 showing an exemplary electronic results type file.
Figure 7A:
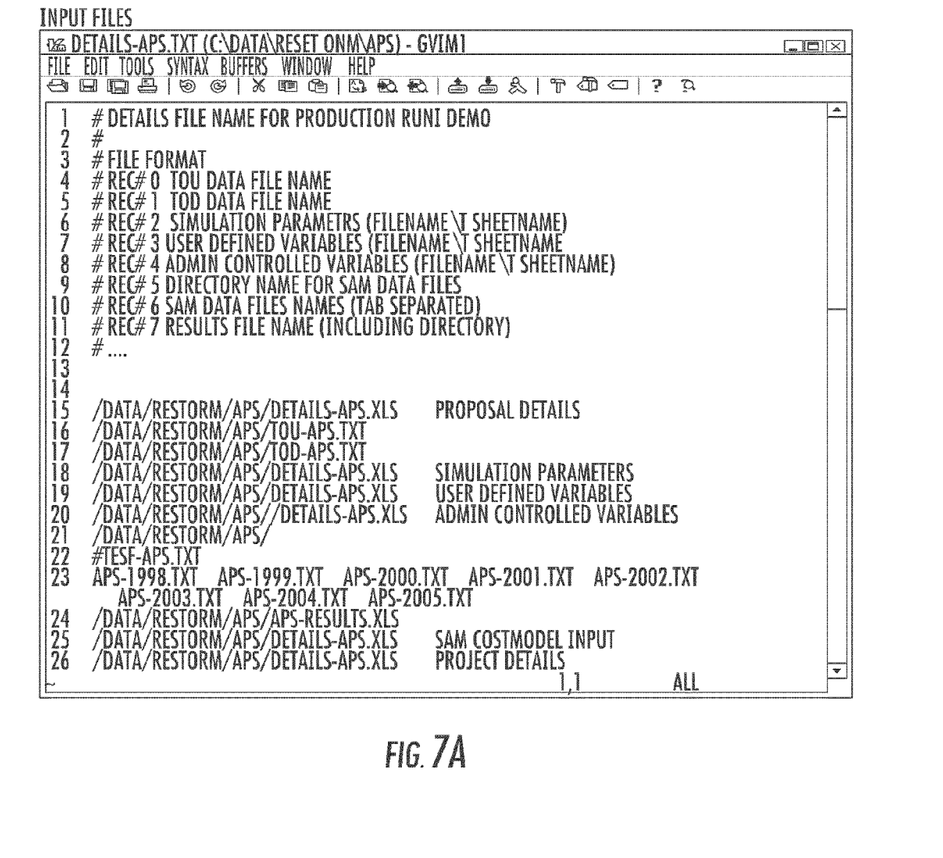
FIG. 7 is an exemplary graphic display produced by computer system of FIG. 1 showing an exemplary electronic results type files.
Figure 7B:
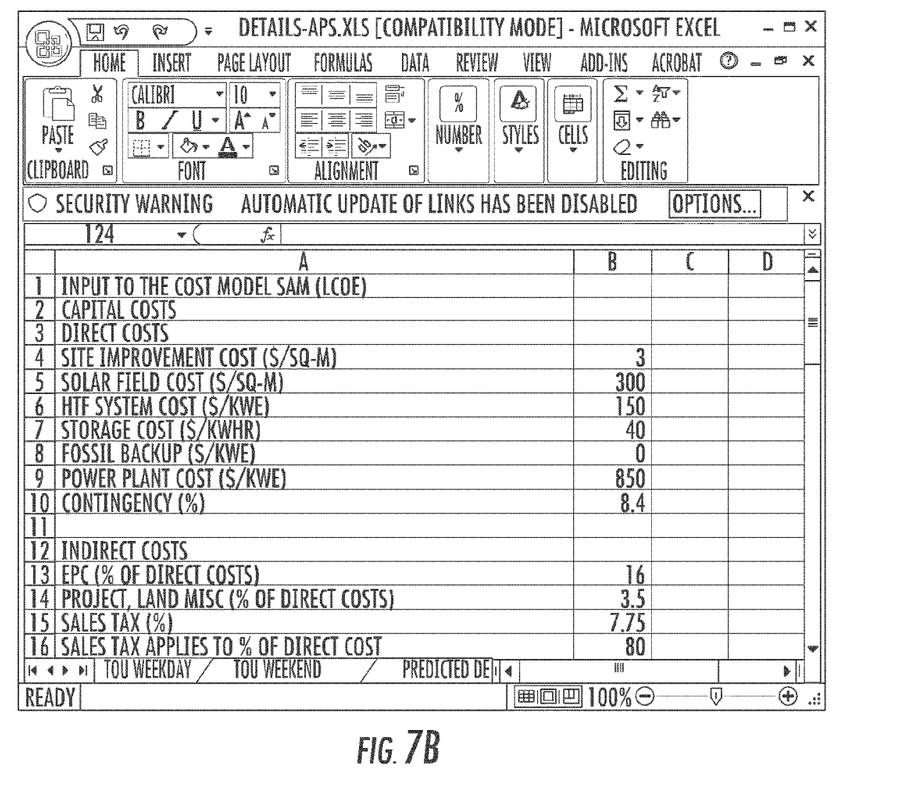
Figure 8:
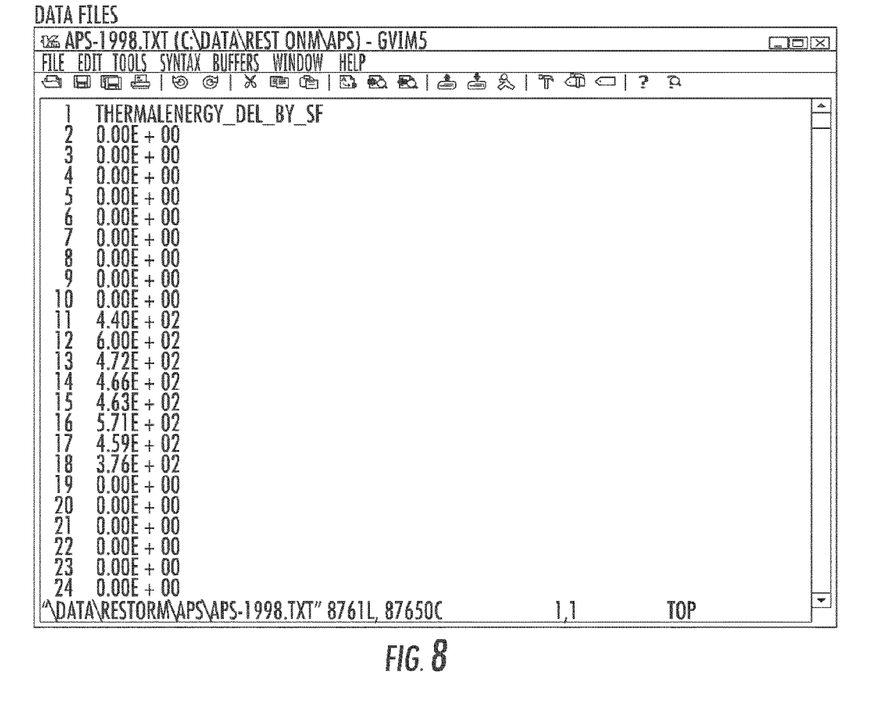
FIG. 8 is an exemplary graphic display produced by computer system of FIG. 1 showing an exemplary electronic data type file.

FIGS. 6-8 show some representative types of files that may be selected by a user and displayed on display device 22 or 53 from choices available in FIG. 5. The files shown have been retrieved and displayed using simulation system 20 executing in particular control logic routines 100, 200, and 300 as described herein. In this illustrative scenario, the user would have selected option (3) in FIG. 5 to display all files including data files. FIG. 6 is an example of a representative Results type file generated by the CSP simulation showing electricity produced MW hrs (megawatt hours) by the plant, thermal energy dump (i.e. thermal energy not used by the CSP system to generate electricity), and thermal energy available from the solar collection field during the corresponding time periods shown (i.e. the years identified in row 1, columns B-J). FIG. 7 shows examples of representative Input type files used by system 20 to run the CSP simulation. And FIG. 8 shows an example of a representative detailed Data type file (i.e. Solar Energy Delivered by the Solar Collection Field). It should be noted that the file types include Excel and gVIM as noted in the top of each figure. As shown in FIGS. 6-8, the Display Manager control logic routine 100 and ancillary routines 200, 300 has advantageously recorded the path information associated with each file (see, e.g. FIG. 5 "Results file [1] data/restorm/apps-results.xls") to allow central computer 21 to automatically retrieve each file from anywhere in simulator system 20 and display the file contents to a user accessing the system from any system access port (e.g. networked computers 51 or computer 21). The Display Manager control logic routine 100 further advantageously has automatically tracked and associated the proper computer program or software necessary required to display these various file types to the user irrespective of the program that may be necessary execute the associated simulation software module or program. Accordingly, the user has not been required to tell system 20 which program is required to display each file type.

It will be appreciated that the files described herein may be stored on computer readable medium disposed in data storage devices located anywhere accessible to the system including databases 41, 43, or local databases storage 52 associated with networked computers 51 ((see FIG. 1). In some embodiments, simulator system 20 may configured and adapted to operably connect to the Internet via conventional communication means for employing cloud computing wherein any of the components, processors, databases, etc. described herein may be remotely located from each other and/or even reside on third party servers and networks accessibly to system 20 via the Web. Accordingly, the present invention is not limited by the physical location of any of the components used by system 20.

The foregoing program instructions/control logic routines described herein which direct the operation of central computer 21 may be created by any conventional programming techniques. Accordingly, it is well within the ambit of those skilled in the art to configure and prepare the code required, and program computer 21 with the code enabling the computer to execute the logic routines and achieve the functionality and benefits described herein.

It will further be appreciated that although embodiments described herein have been described for convenience in applications involving CSP plant simulations for illustrative purposes, the present invention has broader applicability. Accordingly, embodiments of the present invention including the Display Manager software object may be applied with equal benefit to not only other types of simulations, but to other computer processes wherein it would be beneficial for a user to facilitate retrieval and display of files used or created during a particular process. There present invention is therefore not limited to use in CSP plant simulations alone.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A system for tracking and displaying computer files usable in computer simulations of an engineered process plant, comprising:
a computer processor and computer readable medium accessible to the processor;
a plurality of grid computers, each grid computer configured to receive instructions from said computer processor;
control logic stored on the computer readable medium and executed by the processor, the processor when executing the control logic being operative to:
implement a data object that tracks, stores, retrieves and displays all simulation-related files used or created during the computer simulations, said data object configured to receive data and instructions from one or more grid computers of said plurality of grid computers performing the computer simulations, in real time during the computer simulations, wherein each grid computer is configured to run at least one of a plurality of different modeling calculations;
run the simulations of the process plant, compile a list of all simulation-related files used or created during the simulations by storing information identifying each simulation-related file in the data object;
display the list; and
automatically associate, in real-time during the simulations, each simulation-related file with a software program required to open and display the contents of each simulation-related file.

2. The system of claim 1, wherein the processor is further operative to store a full path name of each simulation-related file on the list by storing information identifying each simulation-related file from the data object, and recording the information identifying each said file in a tracking-review file created by the processor and stored on the computer readable medium.

3. The system of claim 2, wherein the full path name of each simulation-related file is added to the tracking-review file in real time as the simulation is run by the processor for retrieving each simulation-related file.

4. The system of claim 2, wherein the processor is further operative to: receive a selection request by a user to view at least one of the displayed simulation-related files; retrieve each requested file using the full path name of each requested file; and automatically open and display the contents of each requested file on a graphic display device to the user using the software program associated with each requested file.

5. The system of claim 4, wherein the processor is further operative to sort the simulation-related files according to file type and display the list of simulation-related files grouped by file types.

6. The system of claim 2, wherein the processor is further operative to retrieve a tracking-review file from a previously run simulation based on receiving a request input into the system by a user.

7. The system of claim 1, wherein the list of simulation-related files includes files selected from the group consisting of design details files, data files, and results files.

8. The system of claim 1, wherein the simulation-related files contain information used in running a computer simulation of a solar thermal energy power generation plant.

9. A method performed by a computer processor executing program instructions for tracking and displaying computer files used in running computer simulations of an engineered process plant, the method comprising:
running a computer simulation of the process plant on a computer system including a computer processor and computer readable medium operably accessible to the processor and containing program instructions executed by the processor, wherein the computer simulation is run on a plurality of grid computers, each grid computer configured to receive instructions from the computer processor;
the processor implementing a data object that tracks, stores, retrieves and displays all simulation-related files used or created during the computer simulations, said data object configured to receive data and instructions from one or more grid computers of said plurality of grid computers performing the computer simulations in real time during the computer simulation, wherein each grid computer is configured to run at least one of a plurality of different modeling calculations;

compiling a list, during the simulation, of all simulation-related files used or created during the simulation by storing information identifying each simulation-related file in the data object;

automatically associating, in real-time during the simulation, each simulation-related file with a respective software program required to open and display the contents of each simulation-related file; and the processor displaying the list of simulation-related files in the data object to a user on a graphic display device.

10. The method of claim 9, further comprising the processor sorting the simulation-related files according to file type and displaying the simulation-related files grouped by file types.

11. The method of claim 9, further comprising the processor receiving a selection request by the user to display one or more of the simulation-related files, retrieving the selected file or files, and displaying the contents of the selected file or files.

12. The method of claim 9, wherein the processor automatically opens and displays the contents of the selected file or files with the software program without the user specifying the program.

13. The method of claim 9, further comprising the processor storing the simulation-related files in one or more databases accessible to the system.

14. The method of claim 9, further comprising the processor assigning a name to the tracking-review file and storing the tracking-review file on the computer readable medium.

15. The method of claim 14, wherein before the step of running a simulation, the processor retrieves and displays contents of a stored tracking-review file from a previously run simulation based on an input request from the user.

16. The method of claim 9, further comprising the processor displaying a choice to the user to retrieve and view some or all of simulation-related files in the tracking-review file.

17. A system for identifying and displaying electronic files in a distributed computer system accessed or created during a computer process, the system comprising:

a computer having a processor and in communication with the distributed computer system;

a memory in communication with said processor;

wherein said processor is adapted to execute machine readable instructions stored on said memory, said instruction operable to cause the processor to:

implement a data object that tracks, stores, retrieves and displays all files used or created during the computer process, said data object configured to receive data and instructions from one or more grid computers performing the computer process in real time during the computer process, wherein each grid computer is configured to run at least one of a plurality of different modeling calculations;

use said data object to track all files accessed and/or created during the computer process, wherein said tracking includes determining a software program that accessed and/or created each file and automatically associating, in real-time during the computer process, each file used or created with a respective software program required to open and display the contents of each file used or created during the computer process;

store in the data object information relating to each file accessed and/or created during the computer process, wherein the file information includes at least the software program that accessed and/or created an associated file, a full path name of the associated file, and a type of the associated file wherein the type of the associated file is one of: a design/details file, a data file, and a results file;

retrieve the information relating to each file from the data object and record the information relating to each file in a tracking-review file;

retrieve said file information for at least some of the files accessed and/or created during the computer process from the tracking review file; and display on a graphical display device, said retrieved file information.

* * * * *